United States Patent
Shih et al.

(10) Patent No.: US 7,591,242 B2
(45) Date of Patent: Sep. 22, 2009

(54) PLASMA REFORMER AND INTERNAL COMBUSTION ENGINE SYSTEM HAVING THE SAME

(75) Inventors: Ming-Shiann Shih, Taoyuan County (TW); Heng-Ju Lin, Tainan (TW); Ching-Sung Hsiao, Hsinchu (TW); Ting-Wei Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 164 days.

(21) Appl. No.: 11/681,786

(22) Filed: Mar. 4, 2007

(65) Prior Publication Data

US 2008/0149050 A1 Jun. 26, 2008

(30) Foreign Application Priority Data

Dec. 22, 2006 (TW) .............................. 95148407 A

(51) Int. Cl.
*F02M 29/00* (2006.01)
*F02M 57/06* (2006.01)
*F02B 51/04* (2006.01)

(52) U.S. Cl. ...................... 123/297; 123/590; 123/536; 123/143 B; 422/186

(58) Field of Classification Search ......... 123/297–298, 123/527, 536, 143 B, 590; 422/186; 219/121.36; 60/286

See application file for complete search history.

(56) References Cited

U.S. PATENT DOCUMENTS

| 6,702,991 B1* | 3/2004 | Smaling et al. ......... 422/186.21 |
| 6,843,054 B2* | 1/2005 | Taylor et al. ................... 60/275 |
| 6,881,386 B2* | 4/2005 | Rabinovich et al. ..... 422/186.04 |
| 7,244,281 B2* | 7/2007 | Crane et al. .................... 48/128 |
| 7,285,247 B2* | 10/2007 | Smaling et al. ............. 422/105 |
| 7,407,634 B2* | 8/2008 | Rabinovich et al. ..... 422/186.04 |
| 2006/0201139 A1* | 9/2006 | Khadiya ....................... 60/286 |
| 2007/0160511 A1* | 7/2007 | Rabinovich et al. ......... 422/186 |
| 2007/0187372 A1* | 8/2007 | Rabinovich et al. ..... 219/121.36 |

* cited by examiner

*Primary Examiner*—Hai H Huynh
(74) *Attorney, Agent, or Firm*—Jianq Chyun IP Office

(57) ABSTRACT

A plasma reformer includes a first electrode, a second electrode, an insulating member, an atomizing device and a power supply. A discharge gap is defined between the first electrode and the second electrode. The insulating member is arranged between the first electrode and the second electrode to insulating the first electrode and the second electrode, and a vortex gas flow route is formed between the insulating member and the first electrode, the second electrode. The second electrode penetrates the insulating member. The atomizing device is arranged on the first electrode and/or the second electrode. The power supply is connected with the first electrode and the second electrode.

29 Claims, 4 Drawing Sheets

PLASMA REFORMER AND INTERNAL COMBUSTION ENGINE SYSTEM HAVING THE SAME

CROSS-REFERENCE TO RELATED APPLICATION

This application claims the priority benefit of Taiwan application serial no. 95148407, filed on Dec. 22, 2006. All disclosure of the Taiwan application is incorporated herein by reference.

BACKGROUND OF THE INVENTION

1. Field of the Invention

The present invention relates to a fuel reforming device, and more particularly to a plasma reformer and an internal-combustion engine system having the same.

2. Description of the Related Art

With the advancement of the industry, the consumptions of the conventional energy sources, such as coal, oil, and natural gas, etc., are increased duratively. Since those natural energy sources have limited reserves, new energy sources must be developed to replace the conventional energy sources. A fuel cell is an important new power device with practical values.

Simply speaking, the fuel cell generates electrical power via a redox reaction. Compared with the other modes of generating electricity, the fuel cell has advantages, such as lustration and high efficiency. Basically, the fuel cell uses hydrogen as a fuel, and uses oxygen as an oxidation reagent. The output of the electrical power generated by the fuel cell is proportional to the consumption of the reactants.

A conventional method of obtaining the hydrogen uses a hydrocarbon fuel (for example, natural gas, liquefied petroleum gas (LGP), gasoline, diesel oil, and other fuel oils, etc.) to produce the hydrogen through several steps (including a step of initializing and reforming, and several following steps of purifying). The conventional methods of reforming the hydrocarbon are steam reforming (SR) method, auto thermal reforming (ATR) method, and partial oxidation (POX) method. The purifying step includes a step of desulfurizing, a step of high/low temperature water shift reaction, a step of selective oxidizing carbon monoxide or a step of selective methylating carbon monoxide. In addition, a method of using thin film reactor or filter having an excellent property of selecting the hydrogen is performed to produce the hydrogen. However, the technology of the method is not ripe, and the cost of the method is high so that the method is not popular.

The application of the fuel cell is embarrassed since the infrastructure for supplying hydrogen is not ripe. Furthermore, the hydrogen has a low volumetric energy density such that compared with the hydrocarbon fuel, the hydrogen is difficult to be stored and carried. To eradicate the above problems, a method uses a distributed reformer to transform the hydrocarbon into a gas containing abounding hydrogen to supply the fuel cell.

Conventional reformers must select a special catalyst corresponding to the fuel, to accelerate the reaction. Since the catalyst is easy to be covered by the diversified sulfides or the deposited carbon to be poisoned or lost its active property, the catalyst must be replaced timely so as to increase the cost.

Since the plasma can accelerate the reaction instead of the catalyst, direct current (DC) plasma reformers are paid attention in recently. The conventional DC plasma reformers form DC arc plasma under low voltage and high current. Thus electrodes are easy to be eroded or be melted so that the electrodes have a short using-time. Diversified methods are used to solve the above problem, such as using cooling water or special electrode material to increase the lifetime of the electrodes. Another method is increasing little pressure to increase the resistance in the gas discharge atmosphere such that the electrodes can be protected by decreasing currents and increasing voltages. However, the conventional DC arc plasma fuel reformer lost biggish energy, the electric power is generally larger than real need. The output of the power supply is over a kilowatt. Therefore, these methods cannot effectively solve the problem that the lifetime of the electrodes is short.

SUMMARY OF THE INVENTION

The present invention provides a plasma reformer, and the plasma reformer decreases the plasma power through high voltage, low current output to increase the lifetime of electrodes material to produce a better reforming effect of gas containing hydrogen.

The present invention provides an internal-combustion engine system having a plasma reformer, and the internal-combustion engine system enhances the combustion efficiency of the engine, and decreases the air pollution.

A plasma reformer provided in the present invention, includes a first electrode, a second electrode, an insulating member, an atomizing device and a power supply. A discharge gap is defined between the first electrode and the second electrode. The insulating member is arranged between the first electrode and the second electrode to insulating the first electrode and the second electrode, and a vortex gas flow route is formed between the insulating member and the first electrode, the second electrode. The second electrode penetrates the insulating member. The atomizing device is arranged on the first electrode and/or the second electrode. The power supply is connected with the first electrode and the second electrode.

An internal-combustion engine system having a plasma reformer provided in the present invention, includes a plasma reformer, an engine, a fuel tank, and a high voltage power distribution unit. The plasma reformer includes a first electrode, a second electrode, an insulating member, an atomizing device, a fuel guiding-pipe, a tangential gas guiding-pipe, and a product gas output. A discharge gap is defined between the first electrode and the second electrode. The insulating member is arranged between the first electrode and the second electrode to insulating the first electrode and the second electrode, and a vortex gas flow route is formed between the insulating member and the first electrode, the second electrode. The second electrode penetrates the insulating member. The atomizing device is arranged on the first electrode and/or the second electrode. The fuel guiding-pipe is connected with the atomizing device. The tangential gas guiding-pipe is connected with the vortex gas flow route to guide air into the vortex gas flow route. The product gas output is connected with the vortex gas flow route to export the product gas. The engine is connected with the gas output of the plasma reformer. The fuel tank is connected with the engine and the fuel guiding-pipe to supply a fuel to the engine and the plasma reformer. The high voltage power distribution unit is connected with the engine and the plasma reformer. The high voltage power distribution unit distributes the electric power provided by the engine and supplies the electric power to the engine and the plasma reformer.

Since the plasma reformer of the present invention includes the orbicular gap formed between the first electrode and the second electrode, and the gas flow route, which can produce the vortex plasma. Therefore, the discharge arc is a dynamic arc slipping along the direction of the plasma gas flowing.

Since the discharge arc slips along the direction of the plasma gas flowing to produce the low power atmosphere plasma loop with uniform density, the density of the space discharge current is decreased, the uniformity of the space distributing of the plasma gas is increased, thus the interact region of the plasma power and the mixed fuel gas is increased.

Furthermore, since the dynamic arc is formed, the positive ion bombardment effect of the DC plasma atmosphere disperses. The electrodes are prevented from being facilely eroded or being melted. Therefore, the plasma reformer of the present invention can obtain a large-scale atmospheric pressure plasma region via low power output, and increase the lifetime of the electrode material via increasing the movement of the arc root.

The plasma reformer of the present invention may be assembled with an internal-combustion engine system as the hydrogen combustion-supporting engine such that the combustion efficiency of the engine is increased, and the air pollution is decreased.

Other objects, advantages and novel features of the invention will become more apparent from the following detailed description when taken in conjunction with the accompanying drawings, in which:

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
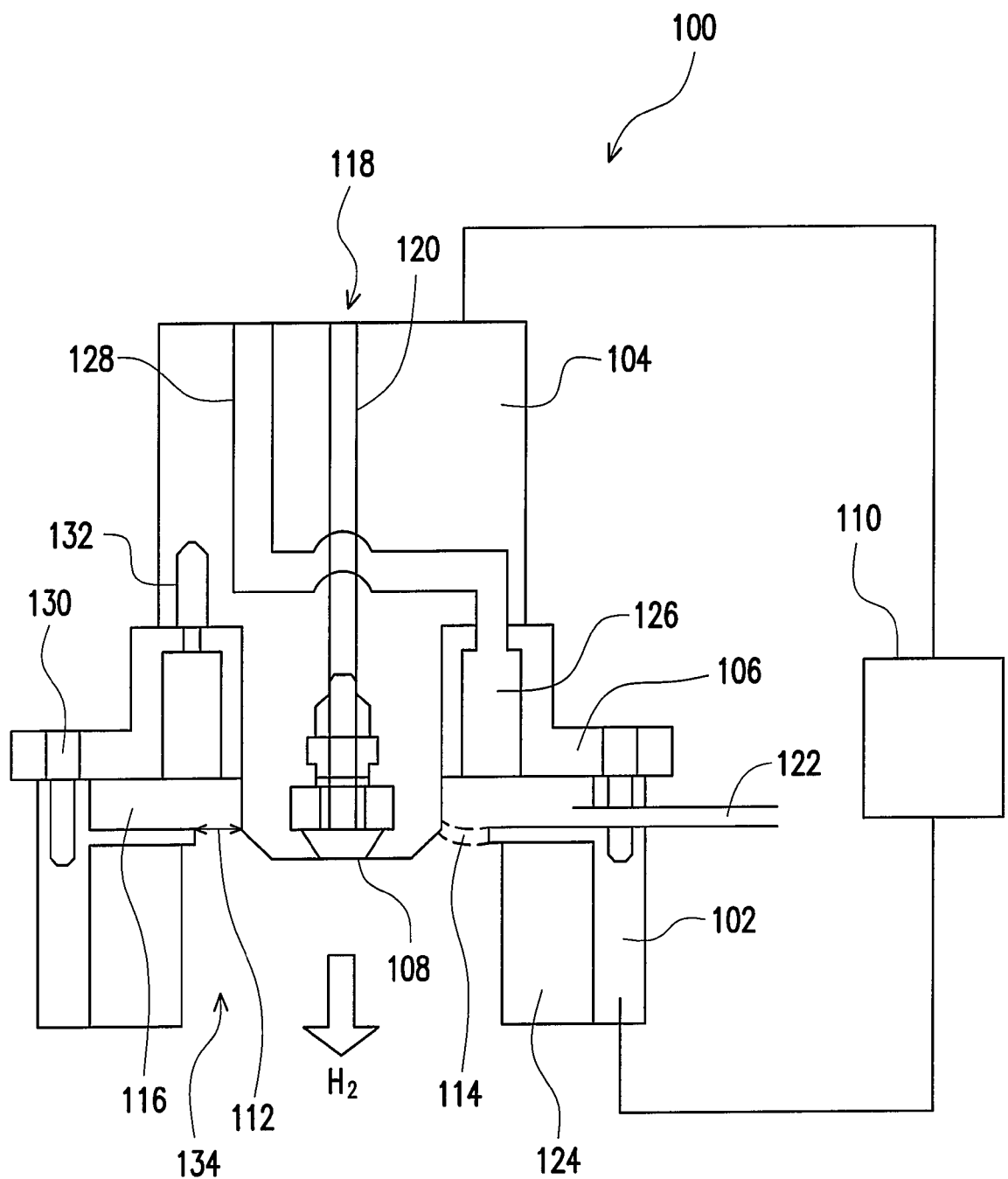
FIG. 1 is a schematic view of a plasma reformer in accordance with a first preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

A plasma reformer of the present invention is a device, which uses a gas to drive the standing arc discharge to accelerate a reforming between hydrocarbon and water (or gas containing oxygen) to produce a hydrogen-rich gas.

FIG. 1 is a schematic view of a plasma reformer in accordance with a first preferred embodiment of the present invention.

Referring to FIG. 1, the plasma reformer 100 includes a first electrode 102, a second electrode 104, an insulating member 106, an atomizing device 108 and a power supply 110.

The first electrode 102 is made of an electric material, for example. The first electrode 102 includes a hollow disk conductor, a hollow tubular conductor having a symmetrical shape along a circumferential direction or a hollow tubular conductor having a periodic symmetrical shape along the circumferential direction, such as a hollow column tubular conductor, a horn-shape tubular conductor shrinking gradually or expanding gradually, or a hollow tubular conductor having a wave inner surface. In this exemplary embodiment, the first electrode 102 is a hollow tubular conductor. Furthermore, the first electrode 102 can has a pipe length larger or equal to a centimeter, which can form a reaction chamber, for example.

The second electrode 104 may be arranged above the first electrode 102. The second electrode 104 is made of an electric material, for example. The second electrode 104 includes a hollow tubular conductor, a solid column conductor, a mesh or axial pin array conductor having a symmetrical shape along a circumferential direction, a mesh or axial pin array conductor having a periodic symmetrical shape along the circumferential direction, such as an orbicular conductor, a taper conductor, a helix conductor, or a spring conductor. In this exemplary embodiment, the second electrode 104 is a solid column conductor. Furthermore, the second electrode 104 can has a length equal or less than 10 centimeters, for example.

The second electrode 104 does not contact directly with the first electrode 102. An orbicular gap 112 (the discharge gap) is defined between the second electrode 104 and the first electrode 102. The orbicular gap 112 is in a range of 1 mm-10 mm, for example. When a high voltage is supplied upon the second electrode 104 and the first electrode 102, the width of the orbicular gap 112 ensures to produce a discharge arc 114. The discharge arc 114 is used to reform a mixture of a fuel (gas-state or liquid-state) and water or air to produce a hydrogen-rich gas which includes hydrogen, carbon monoxide and nitrogen.

The insulating member 106 is arranged between the first electrode 102 and the second electrode 104 to insulate the first electrode 102 and the second electrode 104, and to prevent a short from generating between the first electrode 102 and the second electrode 104. The second electrode 104 penetrates the insulating member 106 and forms a vortex gas flow route 116 between the insulating member 106 and the second electrode 104, the first electrode 102. The vortex gas flow route 116 serves as a producing region of the gas flow field of the vortex plasma. The insulating member 106 is, for example, made of a material selected from a group consisting of high Aluminum Oxide, Ceramic, Quartz, Plastic, and Epoxy resin, etc. The above materials can be used singly or be combined.

The atomizing device 108 may be arranged at the first electrode 102 and/or the second electrode 104. The atomizing device 108 may be an ecumenical atomizing nozzle, which is mounted directly on the first electrode 102 and/or the second electrode 104. Of course, the atomizing device 108 may be formed through mechanically performing a micro-holes process directly on the first electrode 102 and/or the second electrode 104. That is, a plurality of holes is formed directly on the first electrode 102 and/or the second electrode 104 to be serving as the atomizing device 108. The amount of the holes is more than 4, and the diameter of each hole is less or equal to 0.3 mm, for example. Furthermore, the holes may be distributed uniformly or unevenly on the surfaces of the first electrode 102 and/or the second electrode 104 and be arranged at a region (including the plasma exciting position), which is less than 3 cm far away from the plasma exciting position. In this exemplary embodiment, the atomizing device 108 is arranged on the second electrode 104.

Furthermore, referring to FIG. 1, a fuel guiding-pipe 120 is arranged in the second electrode 104. The fuel guiding-pipe 120 has a terminal connected with the atomizing device 108 and the other terminal serving as a fuel input 118 connected with a fuel chamber (not shown). The fuel is fed into the atomizing device 108 through the fuel input 118 with high pressure to form the atomizing fuel reactant, which can effectively utilize the peripheral vortex plasma atmosphere and accelerate the reaction. The fuel reactant fed from the fuel guiding-pipe 120 to the atomizing device 108, is in a liquid-state, a gas-state, or a liquid-state and gas-state mixture. The atomizing device 108 may be also mounted indirectly on the first electrode 102 and/or the second electrode 104 through diversified combining mode.

The power supply 110 is connected with the first electrode 102 and the second electrode 104. The power supply 110 may be a limiting current type high frequency high voltage alternating current (AC) power supply, or a limiting current type high frequency high voltage direct current (DC) power supply. The power supply 110 supply a voltage in a range of 100V-35000V upon the first electrode 102 and the second electrode 104 and form a discharge current in a range of 10 mA-2 A between the first electrode 102 and the second electrode 104 to reform the fuel to a synthetically hydrogen-rich gas.

The plasma reformer 100 may further include one or a plurality of tangent gas guiding-pipe 122. The tangent gas guiding-pipe 122 is connected with the vortex gas flow route 116 to tangentially spray the air, hydrosphere or mixed reactant with high speed thereto to serve as the rotating kinetic energy of the vortex flow field, and adequately mix the air, hydrosphere or reactant, such as oxygen etc., with the fuel reactants from the fuel guiding-pipe 120, to enter the plasma region.

The plasma reformer may further include a heat-resistant member 124. The heat-resistant member 124 may be arranged at the first electrode 102. In this exemplary embodiment, the heat-resistant member 124 is arranged at the inner surface of the first electrode 102 to prevent the reaction chamber of the first electrode 102 from being overheated. The heat-resistant member 124 may be a concentric circular pipe sleeving into the first electrode 102. The heat-resistant member 124 may be made of an insulating heat-resistant material, such as a ceramic fiber material.

The plasma reformer 100 may further include a cooling pipe 126. The cooling pipe 126 may be arranged in the insulating member 126 and surrounding the second electrode 104. Furthermore, the second electrode 104 may include a cooling water guiding-pipe 128 mounted therein. The cooling water guiding-pipe 128 is connected with the cooling pipe 126. The cooling water guiding-pipe 128 and the cooling pipe 126 can feed the circular cooling water to prevent the second electrode 104 from high temperature. Furthermore, the circular cooling water configured for absorbing the heat, can be directly guided the reaction region to increase the heat recovery efficiency.

Furthermore, referring to FIG. 1, screws 130 are used to fix the first electrode 102 and the insulating member 106 to tightly fix the first electrode 102 and the insulating member 106 and prevent the gas from leaking out of the vortex gas flow route 116. Other screws 132 are used to fix the second electrode 104 and the insulating member 106 to tightly fix the second electrode 104 and the insulating member 106.

The following is the operating principle of the plasma reformer 100.

In this exemplary embodiment, the orbicular vortex gas flow route 116 is comprised of the insulating member 106, the hollow orbicular symmetrical first electrode 102 and the solid or hollow orbicular symmetrical second electrode 104 to serve as the producing region of the vortex plasma gas flow route. The orbicular gap 112 (the discharge gap) is formed between the second electrode 104 penetrating into the insulating member 106 and the first electrode 102. A width of the orbicular gap 112 is bases of the high pressure glow discharge or gas destroy discharge power.

Then, the air, water or mixture reactant are sprayed into the vortex gas flow route 116 via the tangent gas guiding-pipe 122 to serve as the rotating kinetic energy of the vortex flow route such that the gas flow route of the vortex plasma produces. Furthermore, the fuel reactant is fed from the fuel guiding-pipe 120 and atomized by the atomizing device 108 to guide the atomizing fuel reactant into the vortex gas flow route 116. In the vortex gas flow route 116, the air, hydrosphere or mixture reactant guiding from the tangent gas guiding-pipe 118 and the fuel reactant guiding from the fuel guiding-pipe 120 mix adequately and then pass through the orbicular gap 112 (the discharge gap) between the first electrode 102 and the second electrode 104.

When the power supply 100 is connected with the first electrode 102 and the second electrode 104, the orbicular gap 112 (the discharge gap) produces high pressure discharge power to form the plasma gas, and make reactions, such as collision ionization, conflagration, or thermal cracking with premixed air, water, or mixture reactant to reform a hydrogen-rich gas. The hydrogen-rich gas exports from the gas output 134. The power supply 100 supply a voltage in the range of 100V to 25000V between the first electrode and the second electrode, and the discharge current between the first electrode 102 and the second electrode 104 is in the range of 10 mA to 2 A. The discharge between the second electrode 104 and the first electrode 102 rapidly slid in the peripheral of the electrodes gap driven by the vortex gas flow, such that the discharge is named as a dynamic arc. The cyclotron frequency of the dynamic arc is in a range of 50 Hz-1 KHz to maintain the steady plasma atmosphere.

Since the design of the orbicular vortex gas flow may affect the discharge arc formed between the first electrode 102 and the second electrode 104. That is, it controls the arc dynamic orbicular extending or arc slipping. Therefore, the space discharge current density is decreased, the uniformity of the plasma gas space distributing is increased, and the reaction region of the plasma and mixture fuel gas is increased.

Furthermore, since the dynamic arc is formed, the positive ion bombardment effect of the DC plasma atmosphere disperses. The electrodes are prevented from being facilely eroded or being melted. Therefore, the plasma reformer 100 of the present invention, can obtain a large-scale atmospheric pressure plasma region via low power output, and increase the using-time of the electrode material via increasing the efficiency of the hydrogen.

In addition, to prevent the reaction temperature in the first electrode 102 from too high, the concentric circular pipe (the heat-resistant member 124) made of the ceramic fiber material, is sleeved into the reaction chamber formed in the first electrode 102 to be configured for serving as a heat-resistant wall.

Furthermore, to prevent the temperature of the second electrode 104 from too high, the cooling water guiding-pipe 128 and the cooling pipe 126 are arranged in the second electrode 104 and the insulating member 106 to cool the second electrode 104.

Figure 2:
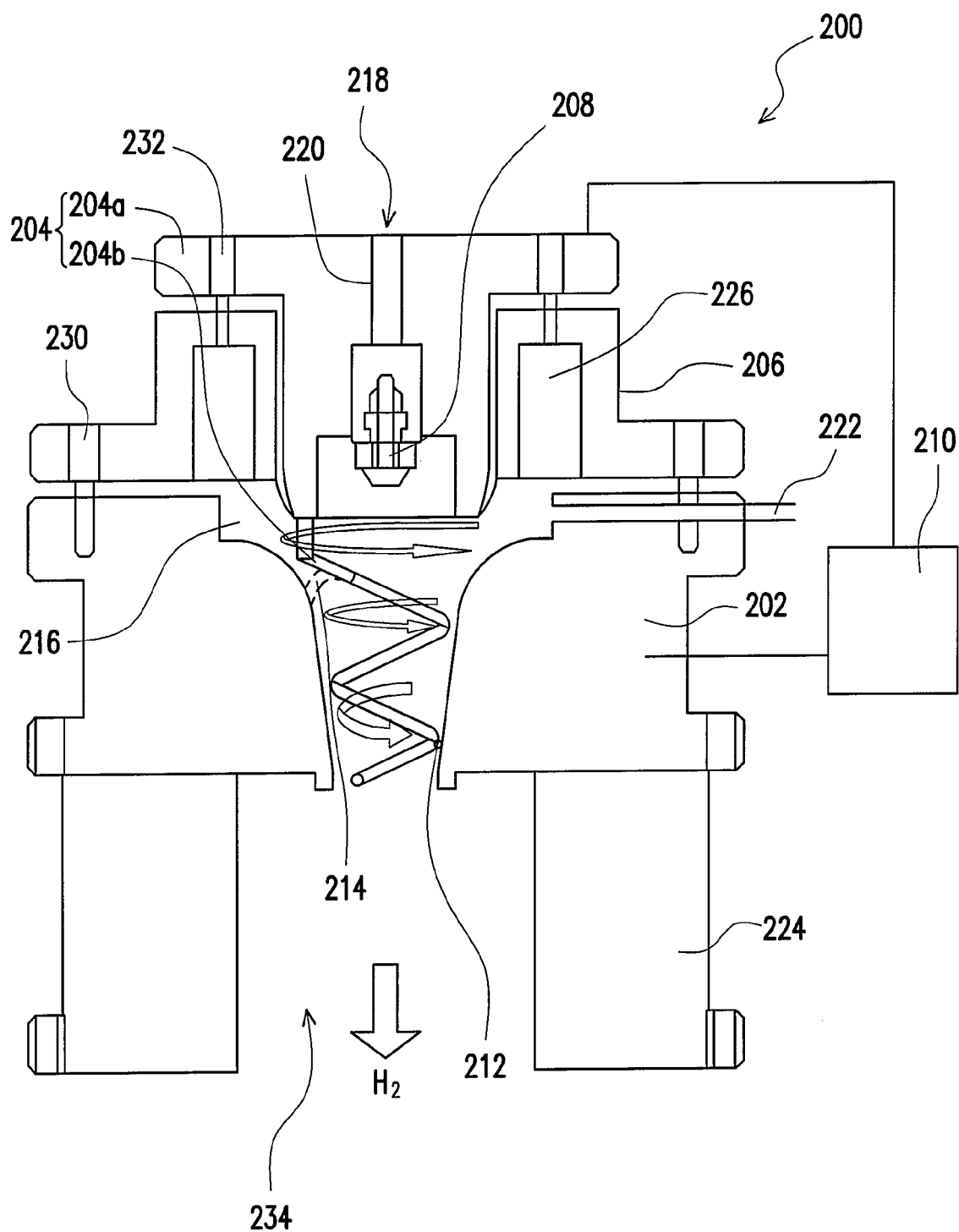
FIG. 2 is a schematic view of a plasma reformer in accordance with a second preferred embodiment of the present invention.

FIG. 2 is a schematic view of a plasma reformer in accordance with a second preferred embodiment of the present invention.

Referring to FIG. 2, the plasma reformer 200 may includes a first electrode 202, a second electrode 204, an insulating member 206, an atomizing device 208 and a power supply 210.

The material and the structure of first electrode 202 is the same as those of the first preferred embodiment. In this exemplary embodiment, the first electrode 202 is a conductor having a loudhailer shape shrinking gradually. Furthermore, the first electrode may have a pipe length larger or equal to a centimeter, which is configured for forming a reaction chamber.

The second electrode 204 may be arranged above the first electrode 202. The second electrode 204 is made of an electric material, for example. The second electrode 204 may be comprised of an electrode base 204a and an electrode extending portion 204b.

The electrode base 204a may be a hollow tubular conductor, a solid column conductor, a mesh or axial pin array conductor having a symmetrical shape along a circumferential direction, such as a cirque conductor, a taper conductor, a helix conductor or a spring conductor.

The electrode extending portion 204b is connected with the electrode base 204a, and extends into the first electrode 202. The electrode extending portion 204b may be a cirque conductor, a taper conductor, a helix conductor, and a spring conductor. In this exemplary embodiment, the electrode base 204a is a solid column conductor, and the electrode extending portion 204b is a helix conductor.

The helix electrode extending portion 204b extends into the first electrode 202. An orbicular gap 212 is maintained between the helix electrode extending portion 204b and the first electrode 202, and extends along the central axis to produce a helix condition between the electrodes. When a high voltage supplies upon the first electrode 202 and the second electrode 204, the gap can ensure to produce a discharge arc 214 such that the discharge arc 214 produce a low power atmosphere plasma with large-scale and uniform density by slipping with the air flow along the helix electrode extending portion 204b. The power of the discharge arc is configured for reforming the mixture of the fuel (gas-state or liquid state) and water or air to produce a hydrogen-rich gas which includes hydrogen, carbon monoxide and nitrogen.

The insulating member 206 is arranged between the first electrode 202 and the second electrode 204 to insulate the first electrode 202 and the second electrode 204 and prevent a short producing between the first electrode 202 and the second electrode 204. The second electrode 204 penetrates the insulating member 206 and forms a vortex gas flow route 216 as a producing region of the vortex plasma gas flow field between the insulating member 206 and the first electrode 202, the second electrode 204. The insulating member 206 is, for example, made of a material selected from a group consisting of high Aluminum Oxide, Ceramic, Quartz, Plastic, and Epoxy Resin, etc. The above materials can be used singly or be combined.

The atomizing device 208 may be arranged on the first electrode 202 and/or the second electrode 204. The atomizing device 208 may be an ecumenical atomizing nozzle, which is mounted directly on the first electrode 202 and/or the second electrode 204. In this exemplary embodiment, the atomizing device 208 is mounted on the second electrode 204. The atomizing device 208 is arranged on the second electrode 208, and is close to the discharge arc 214. The fuel feeding from a fuel input 218 passes through a fuel guiding pipe 220 and feeds the atomizing device with the high pressure to produce the atomizing fuel reactant, which can effectively utilize the peripheral vortex plasma (containing abounding free radicals, ion, electron, and ultraviolet light) to accelerate the reaction.

The power supply 210 is connected with the first electrode 202 and the second electrode 204. The power supply 210 may be a limiting current type high frequency high voltage AC power supply, or a limiting current type high frequency high voltage DC power supply.

The plasma reformer 200 may further include one or a plurality of tangent gas guiding-pipe 222. The tangent gas guiding-pipe 222 is connected with the vortex gas flow route 216 to tangently spray the air, hydrosphere or mixed reactant at a high speed to the vortex gas flow route 216 to serve as a rotating kinetic energy of the vortex flow field, and adequately mix the air, hydrosphere or reactant, such as oxygen, etc., to enter the plasma region.

The plasma reformer 200 may further include a heat-resistant member 224. The heat-resistant member 224 may be arranged at the first electrode 202. In this exemplary embodiment, the heat-resistant member 224 is connected with the first electrode 202 to prevent the reaction chamber of the first electrode 202 from being destroyed. The heat-resistant member 224 may be made of an insulating heat-resistant material, such as a ceramic fiber material.

The plasma reformer 200 may further include a cooling pipe 226. The cooling pipe 126 may be arranged in the insulating member 226 and surrounding the electrode base 204a. The cooling pipe 226 may be fed into circular cooling water to prevent the second electrode 204 from too high temperature. Furthermore, the circular cooling water configured for absorbing the heat, can be directly guided the reaction region to increase the heat recovery efficiency.

Furthermore, referring to FIG. 2, screws 230 are used to fix the first electrode 202 and the insulating member 206 to tightly fix the first electrode 202 and the insulating member 206 and prevent the gas from leaking out of the vortex flow route. Other screws 232 are used to fix the second electrode 204 and the insulating member 206 to tightly fix the second electrode 204 and the insulating member 206.

The following is the operating principle of the plasma reformer 200. The following only shows the differences from the first preferred embodiment.

In this exemplary embodiment, the second electrode 204 is comprised of the electrode base 204a and the helix electrode extending portion 204b. The helix electrode extending portion 204b is connected with the electrode base 204a and extends into the first electrode 202. The orbicular gap 212 is maintained between the helix electrode extending portion 204b and the first electrode 202, and extends along the central axis to produce the helix conduction between the electrodes. A width of the orbicular gap 212 is a base of the power produced by the high pressure glow discharge or the gas destroys discharge.

Then the air, hydrosphere or oxygen, etc., are sprayed from the tangent gas guiding-pipe 222 to the vortex gas flow route 216 to serve as the rotating kinetic energy of the vortex flow field such that the gas flow route of the vortex plasma produces. Furthermore, the fuel reactant is fed from the fuel guiding-pipe 220 and atomized by the atomizing device 208, and then the atomizing fuel reactant is guided into the vortex gas flow route 216. In the vortex gas flow route 216, the air, hydrosphere or mixture reactant from the tangential gas guiding-pipe 222 and the fuel reactant from the fuel guiding-pipe 220 mix adequately and then pass through the orbicular gap 212 (the discharge gap) between the first electrode 202 and the electrode extending portion 204b.

When the power supply 210 is connected with the first electrode 202 and the second electrode 204, the discharge ensures to produce the discharge arc 214, and the discharge arc 214 produces low power atmosphere plasma with the large-scale and uniform density by slipping with the gas flow along the helix electrode extending portion 204b. The power produced by the discharge arc, is used to reform the mixture of the fuel (gas-state or liquid state) and water or air to produce a hydrogen-rich gas. The hydrogen-rich gas exports from the gas output 234.

Since the discharge arc 214 slips with the gas flow along the helix electrode extending portion 204b, the density of the space discharge current is decreased, the uniformity of the space distributing of the plasma gas is increased, thus the interact region of the plasma power and the mixed fuel gas is increased.

Furthermore, since the dynamic arc is formed, the positive ion bombardment effect of the DC plasma atmosphere disperses. The electrodes are prevented from being facilely eroded or being melted. Therefore, the plasma reformer 200 of the present invention can obtain a large-scale atmospheric pressure plasma region via low power output, and increase the lifetime of the electrode material via increasing the efficiency of the hydrogen.

Figure 3:
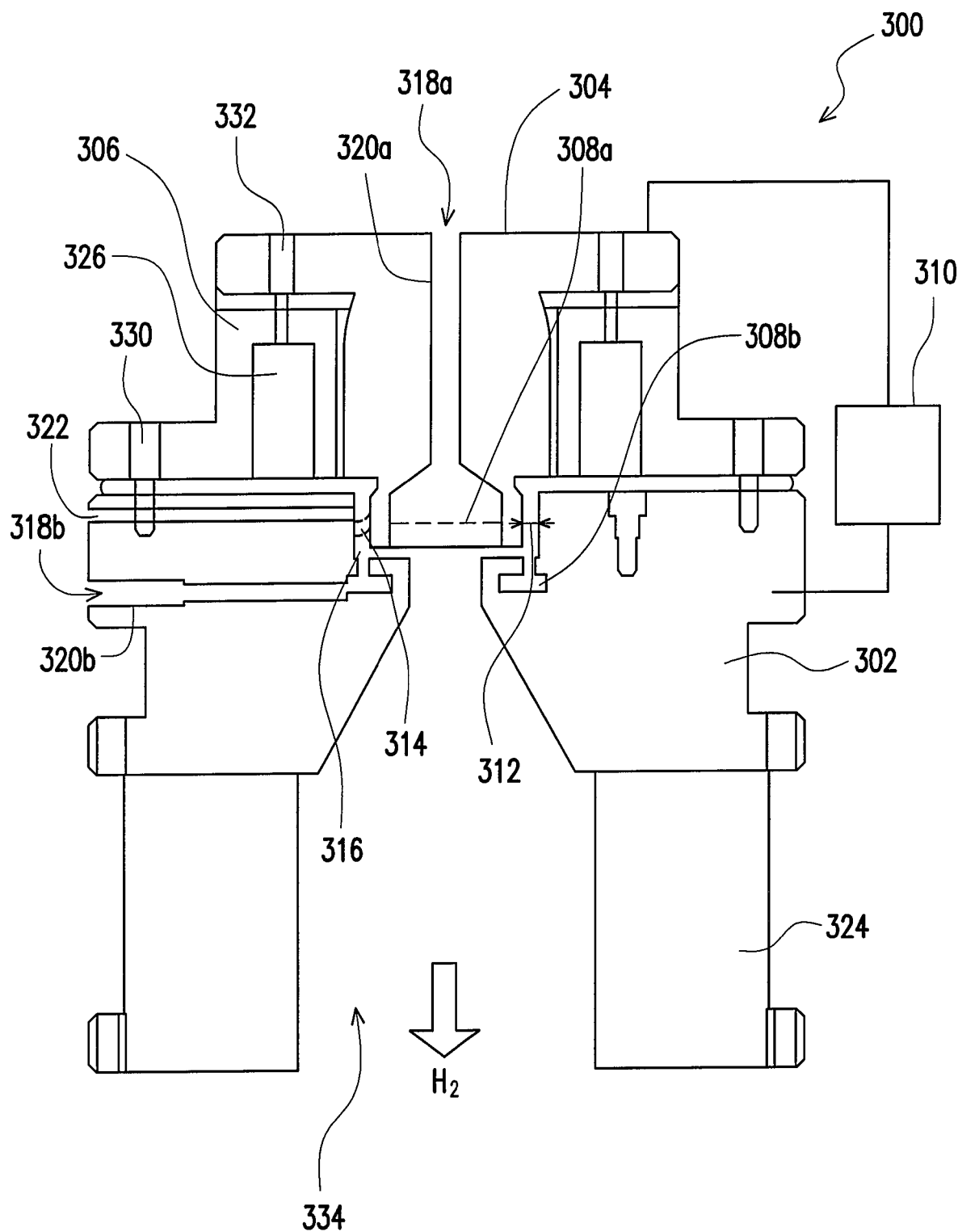
FIG. 3 is a schematic view of a plasma reformer in accordance with a third preferred embodiment of the present invention.

FIG. 3 is a schematic view of a plasma reformer in accordance with a third preferred embodiment of the present invention.

Referring to FIG. 3, the plasma reformer 300 may includes a first electrode 302, a second electrode 304, an insulating member 306, an atomizing device 308a, an atomizing device 308b and a power supply 310.

The material and the structure of first electrode 302 is the same as those of the first preferred embodiment. In this exemplary embodiment, the first electrode 302 is a conductor having a loudhailer shape expanding gradually. Furthermore, the first electrode 302 may have a pipe length larger or equal to a centimeter, which is configured for forming a reaction chamber.

The second electrode 304 may be arranged above the first electrode 302. The second electrode 304 is made of a material and has a structure same to those of the first preferred embodiment. In this exemplary embodiment, the second electrode 304 is a solid column conductor. An orbicular gap 312 (the discharge gap) is maintained between the second electrode 304 and the first electrode 302. When a high voltage supplies upon the first electrode 302 and the second electrode 304, the orbicular gap 312 ensures to produce a discharge arc 314. The discharge arc 314 produce a low power atmosphere plasma loop with uniform density by slipping along a direction of the air flowing. The power of the discharge arc is configured for reforming the mixture of the fuel (gas-state or liquid state) and water or air to produce a hydrogen-rich gas which includes hydrogen, carbon monoxide and nitrogen.

The insulating member 306 is arranged between the first electrode 302 and the second electrode 304 to insulate the first electrode 302 and the second electrode 304 and prevent a short producing between the first electrode 302 and the second electrode 304. The second electrode 304 penetrates the insulating member 306 and forms a vortex gas flow route 316 as a producing region of the vortex plasma gas flow field between the insulating member 306 and the first electrode 302, the second electrode 304. The insulating member 306 is made of a material selected from a group consisting of high Aluminum Oxide, Ceramic, Quartz, Plastic, and Epoxy Resin, etc. The above materials can be used singly or be combined.

The atomizing device 308a may be arranged on the second electrode 304. In this exemplary embodiment, the atomizing device 308a is formed by performing a micro-holes process in series around the electrodes on the geometry region of the second electrode 304 closest to the first electrode 302. That is, the atomizing device 308a is integrated with the second electrode 304. The atomizing device 308b may be arranged on the first electrode 302. The atomizing device 308b is formed by performing the micro-holes process on an about optimum discharge region of the first electrode 302. That is, the atomizing device 308b is integrated with the first electrode 302. The fuel fed from a fuel input 318a, passes through a fuel guiding-pipe 320a and feeds into the atomizing device 308a under high pressure to form an atomizing fuel reactant. The hydrosphere fed from a hydrosphere input 318b, passes through the hydrosphere guiding-pipe 320b and feeds into the atomizing device 308b under high pressure to from an atomizing hydrosphere. The atomizing fuel reactant and the atomizing hydrosphere can effectively utilize the peripheral vortex plasma (containing abounding free radicals, ion, electron, and ultraviolet light) atmosphere to accelerate the reaction.

The power supply 310 is connected with the first electrode 302 and the second electrode 304. The power supply 310 may be a limiting current type high frequency high voltage AC power supply, or a limiting current type high frequency high voltage DC power supply.

The plasma reformer 300 may further include one or a plurality of tangent gas guiding-pipe 322. The tangent gas guiding-pipe 322 is connected with the vortex gas flow route 316 to tangently spray the air, hydrosphere or mixed reactant at a high speed to the vortex gas flow route 316 to serve as a rotating kinetic energy of the vortex flow field, and adequately mix the air, hydrosphere or reactant, such as oxygen, etc., to enter the plasma region.

The plasma reformer 300 may further include a heat-resistant member 324. The heat-resistant member 324 may be arranged at the first electrode 302. In this exemplary embodiment, the heat-resistant member 324 is connected with the first electrode 302 to prevent the reaction chamber of the first electrode 302 from being destroyed. The heat-resistant member 324 may be made of an insulating heat-resistant material, such as a ceramic fiber material.

The plasma reformer 300 may further include a cooling pipe 326. The cooling pipe 326 may be arranged in the insulating member 306 and surrounding the second electrode 304. The cooling pipe 326 may be fed into circular cooling water to prevent the second electrode 304 from too high temperature. Furthermore, the circular cooling water configured for absorbing the heat, can be directly guided the reaction region to increase the heat recovery efficiency.

Furthermore, referring to FIG. 3, screws 330 are used to fix the first electrode 302 and the insulating member 306 to tightly fix the first electrode 302 and the insulating member 306, and prevent the gas from leaking out of the vortex flow route. Other screws 332 are used to fix the second electrode 304 and the insulating member 306 to tightly fix the second electrode 304 and the insulating member 306.

The following is the operating principle of the plasma reformer 300. The following only shows the differences from the first preferred embodiment.

In this exemplary embodiment, the atomizing device 308a and the atomizing device 308b are arranged on the first electrode 302 and the second electrode 304 respectively. The atomizing fuel reactant providing from the atomizing device 308a, the atomizing hydrosphere providing the atomizing device 308b, and the air or oxygen, etc., providing from the tangent gas guiding-pipe 322, are sprayed into the vortex gas flow route 316 to serve as the rotating kinetic energy of the vortex flow field such that the gas flow route of the vortex plasma produces, and then pass through the orbicular gap 312 (the discharge gap) between the first electrode 302 and the second electrode 304.

When the power supply 300 is connected with the first electrode 302 and the second electrode 304, the discharge arc 314 produces the high pressure discharge power to form the plasma gas. The plasma gas and the premixed air, hydrosphere, or mixed reactant, fuel reactant take the reactions, such as collision ionization, conflagration, or cracking to transform a hydrogen-rich gas. The hydrogen-rich gas exports from the gas output 334.

Since the discharge arc slips along the direction of the plasma gas flowing to produce the low power atmosphere plasma loop with uniform density, the density of the space discharge current is decreased, the uniformity of the space distributing of the plasma gas is increased, thus the interact region of the plasma power and the mixed fuel gas is increased.

Furthermore, since the dynamic arc is formed, the positive ion bombardment effect of the DC plasma atmosphere disperses. The electrodes are prevented from being facilely eroded or being melted. Therefore, the plasma reformer 300 of the present invention, can obtain a large-scale atmospheric pressure plasma region via low power output, and increase the using-time of the electrode material via increasing the efficiency of the hydrogen.

In the plasma reformer of the present invention, the reforming reaction, the steam reforming reaction, the partial oxidation reaction, the auto thermal reaction (the steam reaction and the partial oxidation reaction), the cracking reaction, etc., can happen. Furthermore, a catalyst layer can be selectively combined in the back of the plasma reformer to further increase the transforming efficiency.

In the plasma reformer of the present invention, if the hydrocarbon fuel, air, oxygen or carbon dioxide are used as the reactants in the partial oxidation reaction, the main production includes hydrogen, carbon monoxide, and nitrogen.

In the plasma reformer of the present invention, if the hydrocarbon fuel and the hydrosphere are used as the reactants in the steam reforming reaction, the main production includes hydrogen and carbon monoxide.

In the plasma reformer of the present invention, if the hydrocarbon fuel and air, hydrosphere or the additional carbon dioxide are used as the reactants in the auto thermal reaction, the main production includes hydrogen, carbon monoxide, and nitrogen.

The plasma reformer of the present invention may use the liquid-state or gas-state hydrocarbon fuel and air or oxygen as the reactant to take the reforming reaction and produce the combined gas.

The plasma reformed of the present invention may use the industrial waste liquid containing hydrogen and the air or the oxygen as the reactant to take the reforming reaction and produce the combined gas.

The plasma reformer of the present invention may use the liquid-state or gas-state poisonous compound and the air or the oxygen as the reactant to take the cracking reaction to eliminate the toxicity of the material and perform the waste material process.

Figure 4:
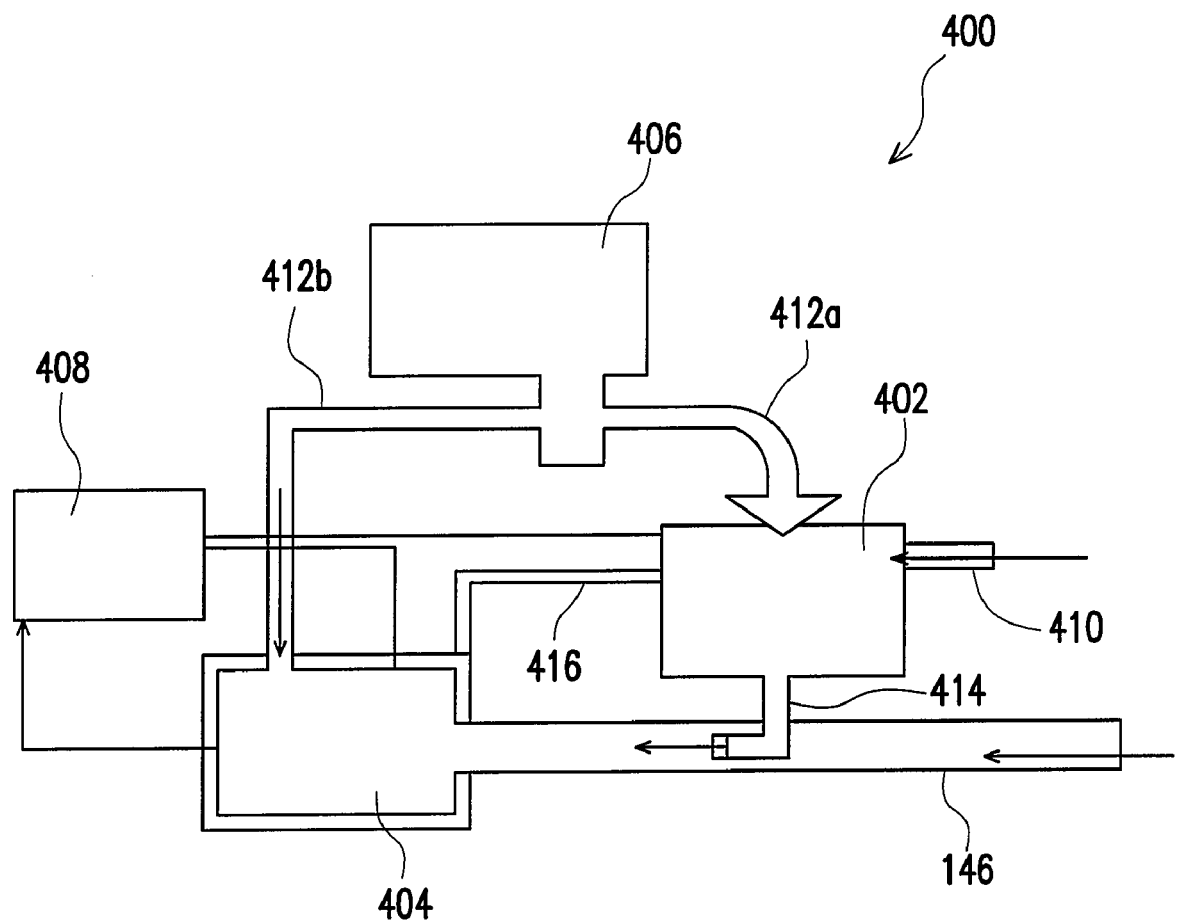
FIG. 4 is a schematic view of an internal-combustion engine system having a plasma reformer of the present invention.

The plasma reformer may be assembled with an internal-combustion engine system as the hydrogen combustion-supporting engine. The following will show the internal-combustion engine system having a plasma reformer. FIG. 4 shows an internal-combustion engine system having the plasma reformer of the present invention.

Referring to FIG. 4, an internal-combustion engine system 400 having the plasma reformer may includes a plasma reformer 402, an engine 404, a fuel tank 406, a high voltage power distribution unit 408.

The plasma reformer 402 may be any plasma reformer described in the above first to third preferred embodiment of the present invention. A discharge gap is formed between a pair of electrodes. A vortex gas flow route is formed between an insulating member and the pair of electrodes. At least one atomizing device is arranged on one or both of the pair of the electrodes.

The plasma reformer 402 may include a tangent gas guiding-pipe 410, a fuel input 412a, and a gas output 414 and a cooling pipe 416. The fuel input 412a is connected with the atomizing device to be configured for feeding the fuel. The tangent gas input 410 is connected with the vortex gas flow route to be configured for feeding the air into the vortex the gas flow route. The gas output 414 is connected with the vortex gas flow route to be configured for export the product gas. The cooling pipe 416 is configured for cooling the electrodes of the plasma reformer 402. Furthermore, the cooling pipe 416 is connected with the engine 404.

The engine 404 may includes an air input 416 and a fuel input 412b. The air input 416 of the engine 404 is connected with the gas output of the plasma reformer 402. Therefore, the product gas (the hydrogen-rich gas, which includes hydrogen, carbon monoxide and nitrogen) of the plasma reformer 42, may mix with the air and guide into the engine 404 to increase the combustion efficiency of the engine, and decrease the air pollution. The mixture proportion of the product gas (hydrogen-rich gas, which includes hydrogen, carbon monoxide and nitrogen) of the plasma reformer 402 and the air, is in a range of 5%-100%. The engine 404 produces electric powers and kinetic energies after it operates, and the electric powers are transmitted to the high voltage power distribution unit 408.

The fuel tank 406 is configured for storing the fuel. The fuel tank 406 is connected with the plasma reformer 402 and the engine 404 through the fuel input 412a and the fuel input 412b to supply the fuel to the plasma reformer 402 and the engine 404. The fuel includes a hydrocarbon fuel.

The high voltage power distribution unit 408 is connected with the plasma reformer 402 and the engine 404 to distribute the electric power produced by the engine 404 and supply the electric power to the plasma reformer 402 and the engine 404.

The following explains the operating principle of the internal-combustion engine system 400 having the plasma reformer.

Firstly, the fuel tank 406 supplies the fuel to the engine 404 to make the engine 404 operating such that the engine 404 produces the electric power and the kinetic energy. The electric power is transmitted to the high voltage power distribution unit 408 to be distributed. The high voltage power distribution unit 408 distributes the electric power produced by the engine 404 and supply the electric power to the plasma reformer 402 and the engine 404.

The fuel tank 406 supplies the fuel to the plasma reformer 402. The fuel is atomized by the atomizing device, and the atomizing fuel is fed into the vortex gas flow route of the plasma reformer. The air is tangently sprayed from the tangent gas guiding-pipe 410 to the vortex gas flow route, and produces a vortex flow field in the vortex gas flow route. The atomizing fuel and air adequately mixes in the vortex gas flow route. The electric power distributed by the high voltage power distribution unit 408, supplies upon the pair of the electrodes of the plasma reformer 402 to produce the high voltage discharge power to form a plasma gas. The plasma gas and the premixed air, fuel make the reactions, such as collision ionization, conflagration, or cracking to transform a hydrogen-rich gas. The hydrogen-rich gas exports from the gas output 414, and mixes with the air to guide into the engine 404 such that the combustion efficiency of the energy is increased, and the air pollution is decreased.

As described above, the plasma reformer of the present invention includes an orbicular gap formed between the first electrode and the second electrode, and a gas flow route, which can produce the vortex plasma. Therefore, the discharge arc is a dynamic arc slipping along the direction of the plasma gas flowing.

Since the discharge arc slips along the direction of the plasma gas flowing to produce the low power atmosphere plasma loop with uniform density, the density of the space discharge current is decreased, the uniformity of the space distributing of the plasma gas is increased, thus the interact region of the plasma power and the mixed fuel gas is increased.

Furthermore, since the dynamic arc is formed, the positive ion bombardment effect of the DC plasma atmosphere disperses. The electrodes are prevented from being facilely eroded or being melted. Therefore, the plasma reformer 300 of the present invention, can obtain a large-scale atmospheric pressure plasma region via low power output, and increase the using-time of the electrode material via increasing the efficiency of the hydrogen.

The plasma reformer may include the heat-resistant member and the cooling pipe. The heat-resistant member prevents the reaction chamber of the first electrode from being heat destroyed. The cooling pipe can be fed into the circular cooling water to prevent the second electrode from too high temperature. Furthermore, the circular cooling water configured for absorbing the heat, can be directly guided the reaction region to increase the heat recovery efficiency The plasma reformer of the present invention may be assembled with an internal-combustion engine system as the hydrogen combustion-supporting engine such that the combustion efficiency of the engine is increased, and the air pollution is decreased.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A plasma reformer, comprising:
    a first electrode;
    a second electrode arranged to define a discharge gap between the first electrode and the second electrode;
    an insulating member arranged between the first electrode and the second electrode to insulate the first electrode and the second electrode, a vortex gas flow route being defined among the insulating member, the first electrode and the second electrode, and the second electrode penetrating the insulating member;
    an atomizing device arranged on the first electrode and/or the second electrode, wherein the atomizing device is formed by performing a micro-holes process on the first electrode and/or the second electrode; and
    a power supply connected with the first electrode and the second electrode.

2. The plasma reformer as claimed in claim 1, wherein the first electrode comprises a hollow disk conductor, a hollow tubular conductor having a symmetrical shape along a circumferential direction, or a hollow tubular conductor having a periodic symmetrical shape along a circumferential direction.

3. The plasma reformer as claimed in claim 1, wherein the first electrode comprises a hollow column tubular conductor, a loudhailer tubular conductor shrinking gradually or expanding gradually, or a hollow tubular conductor having a wave inner surface.

4. The plasma reformer as claimed in claim 1, further comprising a heat-resistant arranged on the first electrode.

5. The plasma reformer as claimed in claim 1, wherein the second electrode comprises a hollow tubular conductor, a solid column conductor, a mesh or axial pin array conductor having a symmetrical shape along a circumferential direction, a mesh or axial pin array conductor having a periodic symmetrical shape along a circumferential direction.

6. The plasma reformer as claimed in claim 1, wherein the second electrode comprises an orbicular conductor, a taper conductor, a helix conductor, or a spring conductor.

7. The plasma reformer as claimed in claim 1, wherein the second electrode comprises:
    a second electrode base; and
    a second extending portion connected with the second electrode base and extending into the first electrode.

8. The plasma reformer as claimed in claim 7, wherein the second electrode comprises an orbicular conductor, a taper conductor, a helix conductor or a spring conductor.

9. The plasma reformer as claimed in claim 7, wherein the atomizing device comprises a plurality of holes, the holes being arranged uniformly or unevenly on the second electrode.

10. The plasma reformer as claimed in claim 1, wherein the insulating member is made of a material selected from a group consisting of high Aluminium Oxide, Ceramic, Quartz, Plastic, or Epoxy Resin.

11. The plasma reformer as claimed in claim 1, further comprising a tangent gas guiding-pipe connected with the vortex gas flow route.

12. The plasma reformer as claimed in claim 1, wherein the power supply comprises a limiting current type high frequency high voltage AC power supply, or a limiting current type high frequency high voltage DC power supply.

13. The plasma reformer as claimed in claim 1, further comprising a cooling pipe arranged in the insulating member to cooling the second electrode.

14. The plasma reformer as claimed in claim 1, wherein the plasma reformer is configured for producing hydrogen to supply to a turbine, an engine, a dynamotor, or a fuel cell.

15. An internal-combustion engine system having a plasma reformer, comprising:
    a plasma reformer, the plasma reformer comprising:
        a first electrode;
        a second electrode arranged to define a discharge gap between the first electrode and the second electrode;
        an insulating member arranged between the first electrode and the second electrode to insulate the first electrode and the second electrode, a vortex gas flow route being formed between the insulating member and the first electrode, the second electrode, the second electrode penetrating the insulating member;
        an atomizing device arranged on the first electrode and/or the second electrode, wherein the atomizing device is formed by performing a micro-holes process to the first electrode and/or the second electrode;

a fuel guiding-pipe connected with the atomizing device;

a tangent gas guiding-pipe connected with the vortex gas flow route to guide air into the vortex gas flow route; and a gas output connected with the vortex gas flow route to export the product gas;

an engine connected with the gas output of the plasma reformer;

a fuel tank connected with the engine and the fuel guiding-pipe to supply a fuel to the engine and the plasma reformer; and a high voltage power distribution unit connected with the engine and the plasma reformer to distribute the electric power provided by the engine and to supply the electric power to the engine and the plasma reformer.

16. The internal-combustion engine system having the plasma reformer as claimed in claim 15, wherein the first electrode comprises a hollow disk conductor, a hollow tubular conductor having a symmetrical shape along a circumferential direction, or a hollow tubular conductor having a periodic symmetrical shape along a circumferential direction.

17. The internal-combustion engine system having the plasma reformer as claimed in claim 15, wherein the first electrode comprises a hollow column tubular conductor, a loudhailer tubular conductor shrinking gradually or expanding gradually, or a hollow tubular conductor having a wave inner surface.

18. The internal-combustion engine system having the plasma reformer as claimed in claim 15, further comprising a heat-resistant arranged on the first electrode.

19. The internal-combustion engine system having the plasma reformer as claimed in claim 15, wherein the second electrode comprises a hollow tubular conductor, a solid column conductor, a mesh or axial pin array conductor having a symmetrical shape along a circumferential direction, a mesh or axial pin array conductor having a periodic symmetrical shape along a circumferential direction.

20. The internal-combustion engine system having the plasma reformer as claimed in claim 15, wherein the second electrode comprises an orbicular conductor, a taper conductor, a helix conductor, or a spring conductor.

21. The internal-combustion engine system having the plasma reformer as claimed in claim 15, wherein the second electrode comprises:

a second electrode base; and a second extending portion connected with the second electrode base and extending into the first electrode.

22. The internal-combustion engine system having the plasma reformer as claimed in claim 21, wherein the second electrode extending portion comprises an orbicular conductor, a taper conductor, a helix conductor and a spring conductor.

23. The internal-combustion engine system having the plasma reformer as claimed in claim 21, wherein the atomizing device is formed by performing a micro-holes process on the first electrode and/or the second electrode.

24. The internal-combustion engine system having the plasma reformer as claimed in claim 21, wherein the atomizing device comprises a plurality of holes, the holes being arranged uniformly or unevenly on the second electrode.

25. The internal-combustion engine system having the plasma reformer as claimed in claim 15, wherein the insulating member is made of a material selected from a group consisting of high Aluminium Oxide, Ceramic, Quartz, Plastic, or Epoxy Resin.

26. The internal-combustion engine system having the plasma reformer as claimed in claim 15, further comprising a cooling pipe arranged in the insulating member to cooling the second electrode.

27. The internal-combustion engine system having the plasma reformer as claimed in claim 15, wherein the cooling pipe further is connected with the engine.

28. The internal-combustion engine system having the plasma reformer as claimed in claim 15, wherein the fuel comprises hydrocarbon fuel.

29. The internal-combustion engine system having the plasma reformer as claimed in claim 15, wherein the product gas comprises hydrogen, carbon monoxide and nitrogen.

* * * * *